United States Patent
Flint et al.

(10) Patent No.: US 12,285,728 B2
(45) Date of Patent: Apr. 29, 2025

(54) GRAPHENE MEMBRANES AND METHODS FOR MAKING GRAPHENE MEMBRANES

(71) Applicant: 2599218 ONTARIO INC., Toronto (CA)

(72) Inventors: Ian Flint, Bedford (CA); Nifemi Oguntuase, Dartmouth (CA)

(73) Assignee: 2599218 ONTARIO INC., Toronto (CA)

( * ) Notice: Subject to any disclaimer, the term of this patent is extended or adjusted under 35 U.S.C. 154(b) by 99 days.

(21) Appl. No.: 18/169,913

(22) Filed: Feb. 16, 2023

(65) Prior Publication Data
US 2023/0191337 A1 Jun. 22, 2023

Related U.S. Application Data

(63) Continuation of application No. 17/059,510, filed as application No. PCT/CA2019/050828 on Jun. 12, 2019, now Pat. No. 11,607,651.

(60) Provisional application No. 62/689,270, filed on Jun. 25, 2018.

(51) Int. Cl.
*B01D 71/02* (2006.01)
*B01D 67/00* (2006.01)

(52) U.S. Cl.
CPC ...... *B01D 71/0211* (2022.08); *B01D 67/0046* (2013.01); *B01D 67/0095* (2013.01); *B01D 2323/10* (2013.01); *B01D 2323/36* (2013.01)

(58) Field of Classification Search
CPC .............. B01D 71/021; B01D 67/0046; B01D 67/0095; B01D 2323/10; B01D 2323/36; B01D 65/102; B01D 67/0041
See application file for complete search history.

(56) References Cited

U.S. PATENT DOCUMENTS

| | | |
|---|---|---|
| 3,457,171 A | 7/1969 | Flowers et al. |
| 6,325,218 B1 | 12/2001 | Lee et al. |
| 8,361,321 B2 | 1/2013 | Stetson et al. |
| 8,871,296 B2 | 10/2014 | Zhamu et al. |
| 9,017,474 B2 | 4/2015 | Geim et al. |
| 9,095,823 B2 | 8/2015 | Fleming |
| 9,120,676 B2 | 9/2015 | Miller |
| 9,318,591 B2 | 4/2016 | Geim et al. |

(Continued)

FOREIGN PATENT DOCUMENTS

| | | | |
|---|---|---|---|
| CN | 102671549 A | 9/2012 | |
| CN | 108159767 A * | 6/2018 | ............ B01D 33/04 |

(Continued)

OTHER PUBLICATIONS

Cruz-Silva et al "Graphene oxide films, fibers, and membranes," Nanotechnol Rev 2016; 5(4); 377-391 (Year: 2016).*

(Continued)

*Primary Examiner* — Krishnan S Menon
(74) *Attorney, Agent, or Firm* — ABM INC.; Adrienne Bieber McNeil

(57) ABSTRACT

A method for making a graphene membrane includes applying a suspension of graphene platelets in a fluid onto a porous substrate, and applying a pressure differential to force the fluid through the substrate to yield a filtered fluid while retaining the graphene platelets on the substrate. The graphene platelets and the substrate form the graphene membrane.

20 Claims, 3 Drawing Sheets

(56) References Cited

U.S. PATENT DOCUMENTS

| | | | |
|---|---|---|---|
| 9,548,364 | B2 | 1/2017 | Geim et al. |
| 9,844,758 | B2 | 12/2017 | Nair et al. |
| 10,201,784 | B2 | 2/2019 | Stoltenberg et al. |
| 10,345,490 | B2 | 7/2019 | Geim et al. |
| 10,651,490 | B2 | 5/2020 | Lozada et al. |
| 10,835,873 | B2 | 11/2020 | Majumder et al. |
| 11,058,997 | B2 | 7/2021 | Flint et al. |
| 11,453,593 | B2 | 9/2022 | Lin et al. |
| 2013/0011304 | A1 | 1/2013 | Schumann |
| 2013/0203873 | A1 | 8/2013 | Linder et al. |
| 2013/0270188 | A1 | 10/2013 | Karnik et al. |
| 2014/0151288 | A1 | 6/2014 | Miller et al. |
| 2015/0038041 | A1* | 2/2015 | Zhamu ............ D03D 15/00 210/500.1 |
| 2015/0141711 | A1 | 5/2015 | Chu et al. |
| 2015/0258506 | A1 | 9/2015 | Mi et al. |
| 2016/0280563 | A1 | 9/2016 | Raveendran-Nair et al. |
| 2016/0297693 | A1 | 10/2016 | Raveendran-Nair et al. |
| 2016/0310908 | A1 | 10/2016 | Yu |
| 2016/0339160 | A1 | 11/2016 | Bedworth et al. |
| 2017/0036911 | A1 | 2/2017 | Swett et al. |
| 2017/0040082 | A1 | 2/2017 | Swett et al. |
| 2017/0174537 | A1 | 6/2017 | Zheng et al. |
| 2017/0260054 | A1 | 9/2017 | Yu et al. |
| 2017/0036174 | A1 | 12/2017 | Stetson, Jr. et al. |
| 2018/0001267 | A1 | 1/2018 | Lee et al. |
| 2018/0154316 | A1 | 6/2018 | Nair et al. |
| 2018/0170002 | A1 | 6/2018 | Park et al. |
| 2018/0290108 | A1 | 10/2018 | Fanchini et al. |
| 2019/0070566 | A1 | 3/2019 | Kidambi et al. |
| 2020/0001245 | A1 | 1/2020 | Karnik et al. |
| 2020/0016547 | A1 | 1/2020 | Zheng et al. |
| 2020/0047132 | A1 | 2/2020 | Rempe et al. |
| 2020/0061546 | A1 | 2/2020 | Raveendran-Nair et al. |
| 2020/0108353 | A1 | 4/2020 | Nair et al. |
| 2020/0147558 | A1 | 5/2020 | Yu et al. |
| 2020/0215496 | A1 | 7/2020 | Raveendran-Nair et al. |
| 2020/0324253 | A1 | 10/2020 | Loh et al. |
| 2020/0384422 | A1 | 12/2020 | Liu |
| 2021/0016232 | A1 | 1/2021 | Liu |
| 2021/0086142 | A1 | 3/2021 | Liu |
| 2022/0072483 | A1 | 3/2022 | Liu et al. |
| 2022/0080360 | A1 | 3/2022 | Raveendran et al. |

FOREIGN PATENT DOCUMENTS

| | | |
|---|---|---|
| JP | 2016159230 A | 9/2016 |
| JP | 2017500195 A | 1/2017 |
| KR | 20180000781 A | 1/2018 |
| WO | 2014152407 A1 | 9/2014 |
| WO | 2016200118 A1 | 12/2016 |
| WO | 2018138486 | 9/2018 |
| WO | 2020152441 A1 | 7/2020 |

OTHER PUBLICATIONS

Office Action issued in CA 3101476 on Sep. 29, 2023.

Extended European Search Report issued on Mar. 11, 2022 in European patent application No. 19826116.6.

Final Office Action Issued in U.S. Appl. No. 17/059,510 on Oct. 21, 2022.

Gongping Liu, Wanqin Jin, Nanping Xu; Graphene-based Membranes; Chemical Society Reviews; 2015; 00, 1-10.

Ibrahim Amr FM et al: "Synthesis of graphene oxide membranes on polyester substrate by spray coating for gas separation", Chemical Engineering Science, Oxford, GB, vol. 190, Jun. 20, 2018 (Jun. 20, 2018), pp. 312-319, XP085431817, ISSN: 0009-2509, DOI: 10.1016/J.CES.2018.06.031.

International Search Report & Written Opinion of the International Searching Authority Mailed on Aug. 23, 2019 in parent PCT Application No. PCT/CA2019/050828.

Notice of Allowance Issued in U.S. Appl. No. 17/059,510 on Dec. 7, 2022.

Office Action Issued in U.S. Appl. No. 17/059,510 on Aug. 16, 2022.

Study of Ion and Solvent Transport through Graphene Oxide Membranes; Kai Wang; A thesis presented to the University of Waterloo in fulfillment of the thesis requirement for the degree of Master of Science in Chemistry; Waterloo, Ontario, Canada, 2016.

Yi Han, Zhen Xu, Chao Gao; "Ultrathin Graphene Nanofiltration Membrane for WaterPurification"; Advanced Functional Materials; 2013;23,3693-3700.

Zhu et al. "Membranes prepared from graphene-based nanomaterials for sustainable applications: a review", Environ. Sci. Nano., 2017, 4, 2267-2285.

Wei-Song Hung, Quan-Fu An, Manuel De Guzman, Hsin-Yi Lin, Shu-Hsien Huang, Wei-Ren Liu, Chien-Chieh Hu, Kueir-Rarn Lee, Juin-Yih Lai, Pressure-assisted self-assembly technique for fabricating composite membranes consisting of highly ordered selective laminate layers of amphiphilic graphene oxide, Carbon, vol. 68, 2014,pp. 670-677, ISSN 0008-6223, https://doi.org/10.1016/j.carbon.2013.11.048. (https://www.sciencedirect.com/science/article/pii/S0008622313011123).

Yang Yong-Hui, Sun Hong-Juan, Peng Tong-Jiang, Huang Qiao. Synthesis and Structural Characterization of Graphene-Based Membranes[J].Acta Phys.—Chim. Sin., 2011, 27(03): 736-742.

Weng, Z., Su, Y., Wang, D.-W., Li, F., Du, J. and Cheng, H.-M. (2011), Graphene-Cellulose Paper Flexible Supercapacitors. Adv. Energy Mater., 1: 917-922. https://doi.org/10.1002/aenm.201100312.

Office Action issued in Canadian patent application No. 3101476 on May 27, 2024.

* cited by examiner

GRAPHENE MEMBRANES AND METHODS FOR MAKING GRAPHENE MEMBRANES

CROSS REFERENCES TO RELATED APPLICATIONS

This application is a continuation of U.S. patent application Ser. No. 17/059,510 having a 371(c) date of Nov. 30, 2020, which is a national stage entry of International Patent Application No. PCT/CA2019/050828 filed on Jun. 12, 2019, which claims the benefit of U.S. Provisional Patent Application No. 62/689,270, filed on Jun. 25, 2018, all of which are incorporated herein by reference in their entirety.

FIELD

This document relates to membranes, for example for use in filters and filtration. More specifically, this document relates to graphene membranes, and to methods for making graphene membranes.

BACKGROUND

US Patent Application Publication No. 2016/0339160 A1 discloses various systems and methods relating to two-dimensional materials such as graphene. A membrane includes a cross-linked graphene platelet polymer that includes a plurality of cross-linked graphene platelets. The cross-linked graphene platelets include a graphene portion and a cross-linking portion. The cross-linking portion contains a 4 to 10 atom link. The cross-linked graphene platelet polymer is produced by reaction of an epoxide functionalized graphene platelet and a (meth)acrylate or (meth)acrylamide functionalized cross-linker.

SUMMARY

The following summary is intended to introduce the reader to various aspects of the detailed description, but not to define or delimit any invention.

According to some aspects, a method for making a graphene membrane includes applying a suspension of graphene platelets in a fluid onto a porous substrate (step a.), and applying a pressure differential to force the fluid through the substrate to yield a filtered fluid while retaining the graphene platelets on the substrate (step b.). The graphene platelets and the substrate form the graphene membrane.

In some examples, the fluid is a liquid. The liquid can be or can include water, alcohol, and/or an organic solvent. The organic solvent can be or can include N-methyl-pyrrolidone.

In some examples, the liquid further includes dissolved ions. The method can further include step c.: during steps a. and b., measuring a content of the ions in the filtered fluid, and when the content reaches a predetermined value, stopping steps a. and b. In some examples, the ions are electrically conductive, and step c. includes measuring an electrical conductivity of the filtered liquid. In some examples ions include or are trivalent or bivalent ions. In some examples, the ions include or are $Al^{3+}$ ions and/or $Ca^{2+}$ ions.

In some examples, the fluid is a gas. In some examples, the gas is or includes hydrogen gas and/or steam.

In some examples, at least some of the graphene platelets are functionalized. In some examples, at least some of the graphene platelets are functionalized as graphene oxide.

In some examples, the substrate is or includes polytetrafluoroethylene (Teflon), polysulfone (PsF), polyester (PE), and/or cellulose.

Also disclosed are graphene membranes made by the above processes. In some examples, the graphene membranes include ions intercalated within the graphene platelets.

Also disclosed are uses of graphene membranes to purify water and/or as a conductive surface.

According to some aspects, a filter includes a stack of graphene platelets. Each graphene platelet includes at least two layers of graphene. Adjacent layers of graphene in the platelets are spaced apart by an interlayer spacing of at least 0.34 nm. A substrate supports the stack of graphene platelets.

In some examples, the graphene platelets of the stack are generally non-porous.

In some examples, the stack is horizontal. In some examples, the stack is vertical. In some examples, the graphene platelets of the stack are non-horizontal. In some examples, the graphene platelets of the stack are non-parallel to the substrate.

In some examples, at least some of the graphene platelets of the stack are functionalized. At least some of the graphene platelets of the stack can be functionalized as graphene oxide. At least some of the graphene platelets of the stack can be functionalized with iron.

In some examples, the membrane further includes ions bonding adjacent layers of graphene. The ions can include trivalent ions or bivalent ions. The ions can include $Al^{3+}$ ions and/or $Ca^{2+}$ ions.

In some examples, the substrate includes polytetrafluoroethylene and/or polyester.

According to some aspects, a method for making a graphene membrane includes spraying a suspension of graphene platelets in a fluid onto a substrate.

In some examples, the fluid is a liquid, and the method further includes drying the liquid. The liquid can include water, alcohol, and/or an organic solvent. The organic solvent can include N-Methyl-2-pyrrolidone.

In some examples, the suspension further includes ions dissolved in the liquid. The ions can include trivalent or bivalent ions. The ions can include $Al^{3+}$ ions or $Ca^{2+}$ ions.

In some examples, the fluid is a gas. The substrate can be porous, and the method can further include applying a pressure differential to force the gas through the substrate while retaining the graphene platelets on the substrate. The gas can include air and/or nitrogen and/or water vapor.

According to some aspects, a method for making a graphene membrane includes a) applying a suspension of graphene platelets in a liquid onto a porous substrate, wherein the liquid further comprises ions; b) applying a pressure differential to force the liquid through the substrate to yield a filtered liquid while retaining the graphene platelets on the substrate as a membrane; c) during steps a) and b) measuring a content of the ions in the filtered liquid; and d) when the content reaches a predetermined value, stopping steps a) and b).

In some examples, the ions are electrically conductive, and step c) includes measuring an electrical conductivity of the filtered liquid. The ions can include trivalent or bivalent ions. The ions can include $Al^{3+}$ ions and/or $Ca^{2+}$ ions.

In some examples, the liquid includes water, alcohol, and/or an organic solvent. The organic solvent can include N-Methyl-2-pyrrolidone.

According to some aspects, a method for making a graphene membrane includes a) applying a suspension of graphene platelets in a fluid onto a continuously moving porous substrate belt; and b) applying a pressure differential to force the fluid through the continuously moving porous substrate belt to yield a continuous layer of graphene platelets on the porous substrate belt.

In some examples, the fluid is a liquid. The liquid can include water, alcohol, and/or an organic solvent. The organic solvent can include N-Methyl-2-pyrrolidone.

In some examples, the suspension further includes ions dissolved in the liquid. The ions can include trivalent or bivalent ions. The ions can include $Al^{3+}$ ions or $Ca^{2+}$ ions.

In some examples, the fluid is a gas. The gas can include air or nitrogen and/or water vapor.

According to some aspects, a method for making a graphene membrane includes a) applying iron-functionalized graphene platelets onto a substrate so that the iron-functionalized graphene platelets are parallel to the substrate; and b) after step a), applying a magnetic field to the iron-functionalized graphene platelets to re-orient the iron-functionalized graphene platelets so that the iron-functionalized graphene platelets are non-parallel to the substrate.

In some examples, step a) includes spraying a suspension of the iron-functionalized graphene platelets in a fluid onto the substrate. The fluid can be a liquid, and the method can further include drying the liquid. The liquid can include water, alcohol, and/or an organic solvent. The organic solvent can include N-Methyl-2-pyrrolidone.

In some examples, the substrate is porous, and step a) includes applying a suspension of the iron-functionalized graphene platelets in a fluid onto the substrate. The method can further include applying a pressure differential to force the fluid through the porous substrate while retaining the graphene platelets on the substrate.

In some examples, the fluid is a gas. The gas can include air and/or nitrogen and/or water vapor.

According to some aspects, a method for making a graphene membrane includes: a. applying a suspension of graphene platelets in a fluid onto a porous substrate by spraying the suspension of graphene platelets in the fluid onto an upstream surface of the porous substrate; and b. applying a vacuum to a downstream surface of the porous substrate to force the fluid through the substrate while retaining the graphene platelets on the substrate, to yield a filtered fluid and a graphene membrane comprising the graphene platelets and the porous substrate.

In some examples, the process is a continuous process. The porous substrate can be in the form of a moving belt, and steps a. and b. may carried out while the porous substrate is moving.

In some examples, the process is a batch process.

In some examples, the fluid is a liquid. The liquid may be or may include water, alcohol, and/or an organic solvent. The organic solvent may be or may include N-methyl-pyrrolidone.

In some examples, the fluid is a gas. The gas may be or may include hydrogen gas and/or steam.

In some examples, the porous substrate includes polytetrafluoroethylene (Teflon), polysulfone (PsF), polyester (PE), and/or cellulose. In some examples, the porous substrate includes polysulfone (PsF).

In some examples, the graphene platelets include graphene oxide.

In some examples, the graphene platelets are non-porous.

In some examples, in the membrane, the graphene platelets are arranged in at least one stack.

In some examples, the stack is a disorderly stack.

In some examples, the method further includes, after steps a. and b., reorienting the graphene platelets.

According to some aspects, a method for filtering water includes: a. making a filter by i) applying a suspension of graphene platelets in a fluid onto a porous substrate by spraying the suspension of graphene platelets in the fluid onto an upstream surface of the porous substrate, and ii) applying a vacuum to a downstream surface of the porous substrate to force the fluid through the substrate while retaining the graphene platelets on the substrate, to yield a filter comprising the graphene platelets and the porous substrate; and b. passing water between the graphene platelets of the filter, to filter the water.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of the claimed subject matter. No embodiment described below limits any claim and any claim may cover processes or apparatuses that differ from those described below. The claims are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

Disclosed herein are membranes that include or are made of graphene platelets. Also disclosed herein are methods for making membranes using graphene platelets. The membranes disclosed herein can be used, for example, in water filtration and purification. Alternatively, the membranes disclosed herein can be used to form conductive surfaces (e.g. for use in batteries), optionally with intercalated ions on or within those surfaces.

As used herein, the term 'platelet' refers to a structure that includes one or multiple (e.g. at least two) layers of graphene. Preferably, platelets include one, two, or three layers of graphene. A platelet can be, for example, up to 15 nanometers thick, with a diameter of up to 100 microns. As used herein, the term 'graphene platelet' can refer to a platelet of pure graphene and/or a platelet of functionalized graphene.

Figures 1A, 1B:
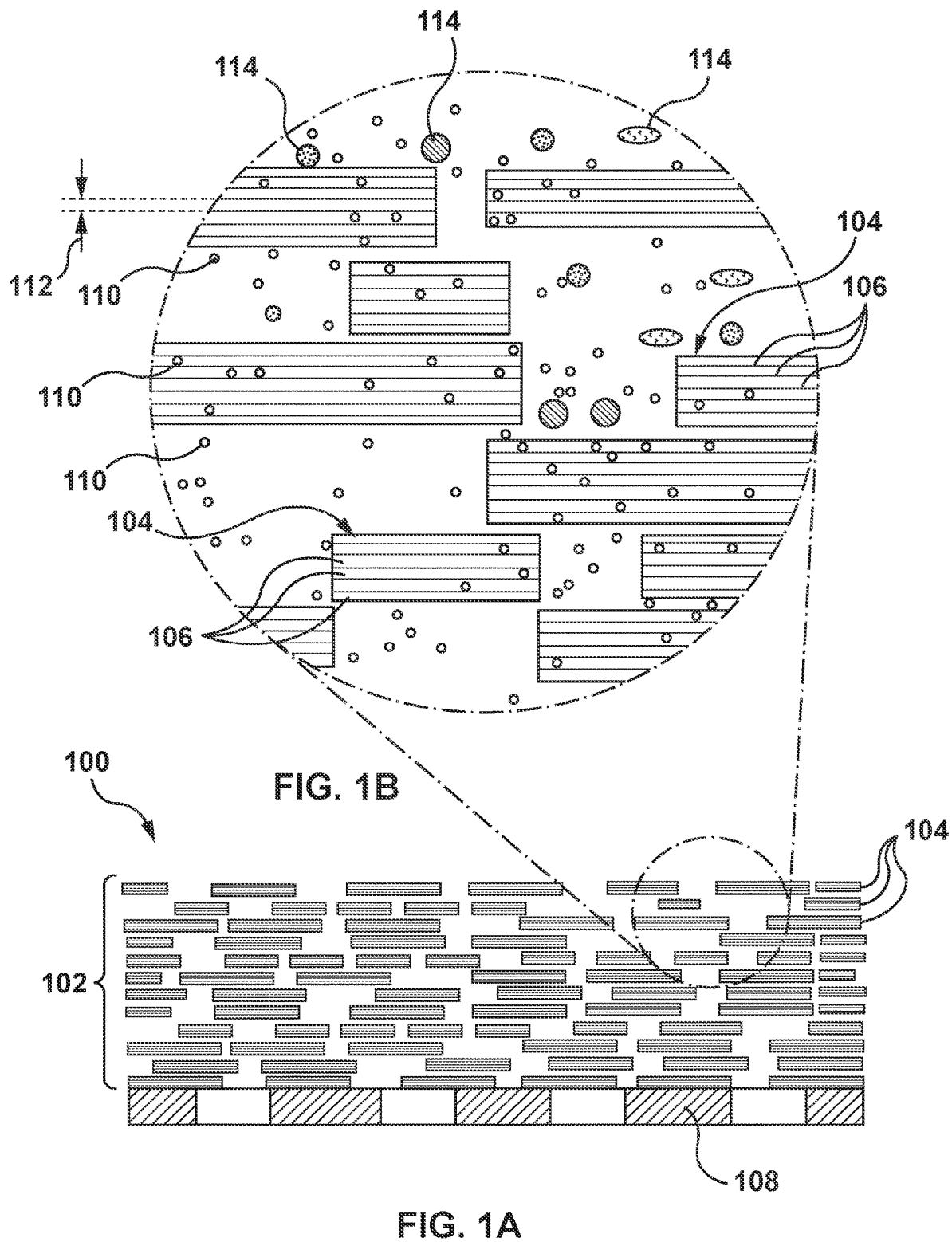
FIG. 1A is a schematic cross-section taken through a membrane.
FIG. 1B is an enlarged view of a portion of the membrane of FIG. 1A.

Referring to FIG. 1A, a first example of a membrane is shown. The membrane 100 includes a stack 102 of graphene platelets 104 (only some of which are labelled in FIG. 1A). As mentioned above, platelets can include one or multiple layers of graphene. In the example shown, each platelet 104 includes at least two layers of graphene 106 (shown in FIG. 1B, and only some of which are labelled).

As used herein, the phrase 'stack of graphene platelets' refers to an arrangement that includes at least two overlapping graphene platelets. The platelets of the stack can be arranged in layers, and each individual layer can include several graphene platelets. The stack of graphene platelets can be an orderly stack (i.e. can include discrete layers), or a disorderly stack (e.g. a pile). The graphene platelets in the stack can all be parallel to each other, or non-parallel to each other.

As used herein, the term 'parallel' refers to orientations in which the referenced objects are exactly parallel, or within 10 degrees of being parallel. As used herein, the term 'non-parallel' refers to orientations in which the referenced objects are at an angle of between 10 degrees and 80 degrees with respect to each other.

In the example of FIGS. 1A and 1B, the stack 102 of graphene platelets 104 is vertical. As used herein, the term 'vertical stack' refers to a structure in which each individual graphene platelet 104 is arranged horizontally (i.e. generally laying flat), with the graphene platelets 104 stacked on top of each other.

As used herein, the term 'horizontal' includes orientations that are exactly horizontal, or within 10 degrees of being horizontal. Similarly, the term 'vertical' includes orientations that are exactly vertical, or within 10 degrees of being vertical.

Figure 2:
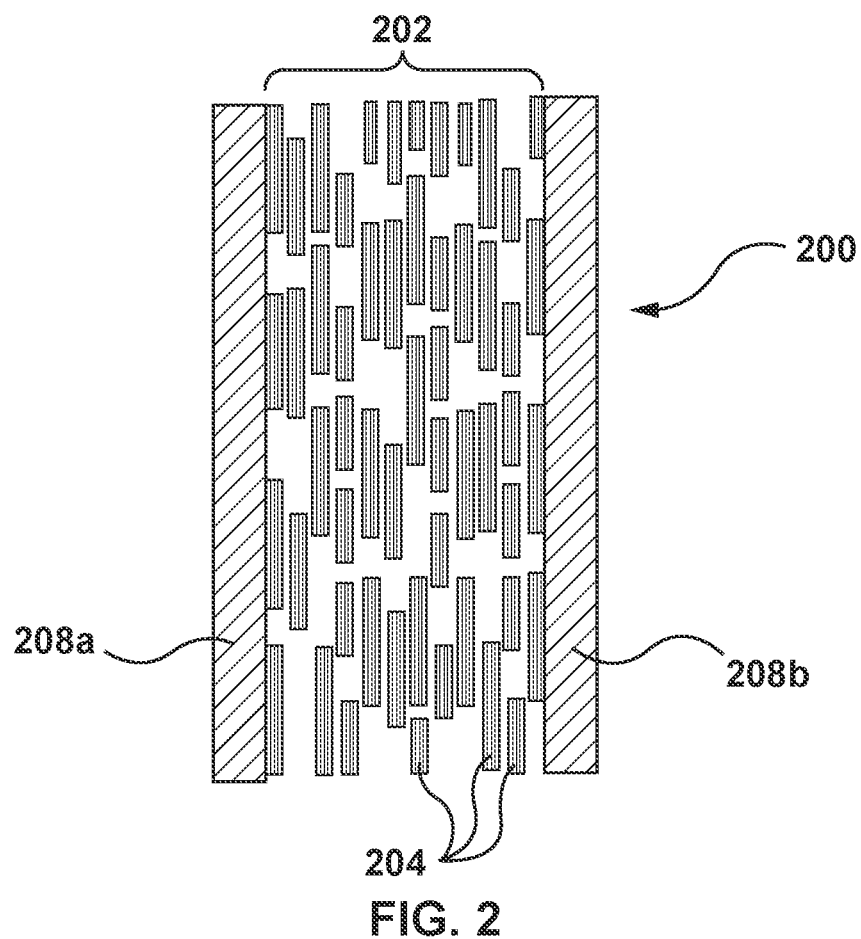
FIG. 2 is a schematic cross-section taken through another membrane.

An alternative example is shown in FIG. 2, in which like features to those of FIG. 1 are referred to with like reference numerals, incremented by 100. In the example of FIG. 2, the stack 202 of graphene platelets 204 is horizontal. As used herein, the term 'horizontal stack' refers to a structure in which each individual graphene platelet 204 is arranged vertically (i.e. generally standing on its edge), with the graphene platelets 204 positioned beside each other.

Figure 3:
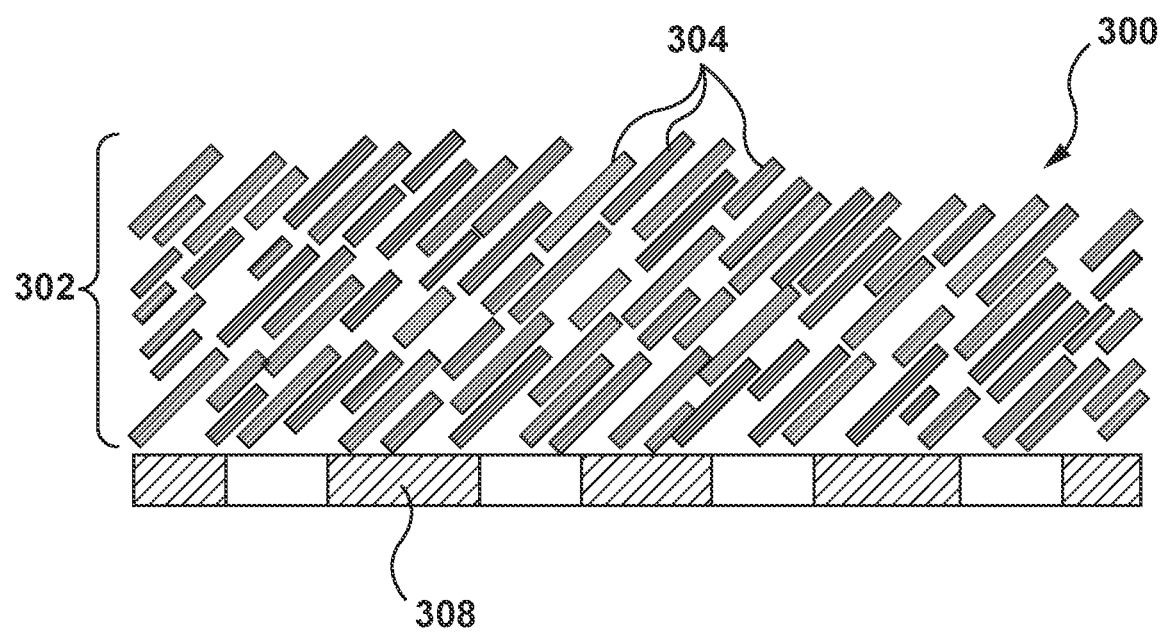
FIG. 3 is a schematic cross-section taken through another membrane.

A further alternative example is shown in FIG. 3, in which like features to those of FIG. 1 are referred to with like reference numerals, incremented by 200. In the example of FIG. 3, the individual platelets 304 of the stack 302 are non-horizontal and also non-vertical. That is, the individual platelets 304 of the stack 302 are at an angle of about 45 degrees with respect to the horizontal. In other examples, individual platelets of the stack may be at an other angle, for example an angle of between about 10 degrees and about 80 degrees with respect to the horizontal.

Referring back to FIG. 1, the membrane 100 further includes a substrate 108 supporting the stack 102 of graphene platelets 104. The substrate 108 can be or can include, for example, polytetrafluoroethylene (Teflon), polysulfone (PsF) (also referred to as polyether sulfone), cellulose, polyester, and/or other materials.

In the example of FIG. 1, the substrate 108 is porous, to allow the passage of water or another filtrate. Similarly, in the example of FIG. 3, the substrate 308 is porous.

Referring to FIG. 2, the membrane 200 includes a pair of substrates 208a and 208b, on opposed sides of the stack 202. In this example, the substrates 208a and 208b are non-porous. In alternative examples, the substrates can be porous, partially porous, or have porous sections.

In the examples of FIG. 1, the platelets 104 are parallel to the substrate 108. Similarly, in the example of FIG. 2, the platelets 204 are parallel to the substrates 208a and 208b. In the example of FIG. 3, the platelets 304 are non-parallel to the substrate 308.

As mentioned above, the membranes disclosed herein can be used, for example, in water filtration and purification. However, in the examples of FIGS. 1 to 3, the graphene platelets 104, 204, and 304 are generally non-porous (also referred to as 'non-perforated'), and the membranes 100, 200, and 300 do not rely on passage of filtrate molecules through pores or perforations in the graphene layers. Instead, as shown in FIG. 1B, the filtrate molecules 110 (only some of which are shown and labelled) pass between adjacent graphene layers 106 in the platelets 104, and between adjacent platelets 104. That is, adjacent layers of graphene 106 are spaced apart by an interlayer spacing 112. The interlayer spacing 112 is sufficiently large to allow the passage of filtrate molecules 110, but too small to allow the passage of larger ions or molecules or particles 114. In examples wherein the filtrate 110 is water, the interlayer spacing 112 may be, for example, at least 0.34 nm.

In order to obtain a desired interlayer spacing, the graphene may be functionalized. For example, in platelets of pure graphene, the interlayer spacing may be approximately 0.34 nm. In platelets of functionalized graphene, e.g. graphene that is functionalized as hydroxylated graphene (also known as graphene oxide), the interlayer spacing may be approximately 0.83 nm.

In some examples, in order to obtain a desired interlayer spacing and to stabilize the platelets, adjacent layers of graphene may be bonded together, optionally with ions. In some examples adjacent layers of graphene are bonded together with trivalent ions such as $Al^{3+}$. In some examples adjacent layers of graphene are bonded together with bivalent ions such as $Ca^{2+}$. In alternative examples, other ions of other valencies may be used.

The graphene membranes 100, 200, and 300 may be made in a variety of ways.

In a first example, a suspension of graphene platelets in a fluid (e.g. a gas or a liquid) is sprayed onto the substrate.

In examples where the fluid is a liquid, the substrate can optionally be non-porous (either partially or fully), so that the liquid as well as the graphene platelets build up on the substrate. The method can then include a drying step to remove the liquid. Alternatively, the substrate can be porous.

In examples where the fluid is a gas, the substrate can optionally be porous, with the pores being too small to allow the passage of the graphene platelets, but sufficiently large to allow the passage of the gas. A pressure differential can be applied (e.g. by applying a vacuum on the downstream end of the membrane or a blowing force on the upstream end of the membrane) to force the gas through the substrate, while retaining the graphene platelets on the substrate. Examples of suitable gases include hydrogen gas, and steam.

In a second example, a suspension of graphene platelets in a liquid is applied onto a porous substrate (in a fashion other than spraying), in which the pores are too small to allow the passage of the graphene platelets, but sufficiently large to allow the passage of the liquid. A pressure differential can be applied (e.g. by applying a vacuum on the downstream end of the membrane or applying a positive force on the upstream end of the membrane) to force the liquid through the substrate, while retaining the graphene platelets on the substrate.

In this example, the liquid can contain dissolved ions (e.g. trivalent or bivalent ions as described above), and after the liquid is forced through the substrate, the content of the ions in that liquid (also referred to as a filtered liquid) can be measured. For example, the ions can be electrically conductive, and the electrical conductivity of the filtered liquid can be measured to give an indication of the content of the ions in the filtered liquid. The content of ions in the filtered liquid can be indicative of an extent to which the membrane has formed. For example, when application of the suspension to the substrate has just begun, the membrane will be relatively thin, and the ions will readily pass through the membrane and the substrate, together with the liquid. If the electrical conductivity of the fluid is measured at this time, it will be relatively high. After some time, with ongoing application of the suspension to the substrate, the membrane will build up, and the ions will get trapped by the membrane, and will not pass through the substrate with the liquid. If the electrical conductivity of the filtered liquid is measured at this time, it will be relatively low. Alternatively, if there is a problem with the formation of the membrane (e.g. if it includes a tear), the electrical conductivity of the filtered liquid will remain relatively high, even after some time. Accordingly, the content of the ions in the filtered liquid can give an indication of the extent to which the membrane has formed, and to the quality of the membrane. When the content of the ions reaches a predetermined value, application of the suspension to the substrate can be stopped.

In any of the above examples, after depositing the graphene platelets onto the substrate, the graphene platelets can be re-oriented. For example, either of the above processes can be carried out to yield a membrane similar to that shown in FIG. 1 or FIG. 2, in which the platelets are parallel to the substrate. The graphene platelets can then be reoriented so that they are non-parallel to the substrate, for example as shown in FIG. 3. In some examples, in order to re-orient the graphene platelets, iron-functionalized graphene platelets may be used. The iron-functionalized graphene platelets may be applied on to the substrate so that they are parallel to the substrate. Then, a magnetic field may be applied to the iron-functionalized graphene platelets. Due to the interaction of the iron in the platelets with the magnetic field, the platelets can move so that they are no longer parallel to the substrate (e.g. they may be inclined with respect to the substrate, or may become curved).

In any of the above examples, the process can be continuous, and/or can be used to create a relatively large membrane. For example, the substrate can be in the form of a moving belt, and the suspension can be applied to the belt as it moves.

In any of the above examples in which the fluid is a liquid, the liquid may be (but is not limited to) water, alcohol, and/or an organic solvent such as N-Methyl-Pyrrolidone (NMP). Ions can optionally be dissolved in the liquid.

In any of the above examples where the fluid is a gas, the gas may include air and/or nitrogen and/or water vapor and or hydrogen gas.

While the above description provides examples of one or more processes or apparatuses, it will be appreciated that other processes or apparatuses may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

Examples

A suspension of 8 ppm of graphene oxide platelets (purchased from the "Graphene Superstore") in de-ionized water was created by sonification. Several porous substrates of 47 mm diameter were created. The porous substrate was made of commercially available polysulfone. The suspension was filtered through each substrate using a 1 bar (100 kPa) pressure drop, using 62 mg graphene oxide per $m^2$ of substrate surface area. The pressure drop was created by vacuum. The substrates and deposited graphene oxide were then oven dried at 60 degrees C. until dry, to create graphene oxide mem branes.

Flux of each membrane was tested by dead end filtering water containing 4000 ppm salt dissolved in water. Tests were conducted at 5, 7, and 15 bar.

Figure 4:
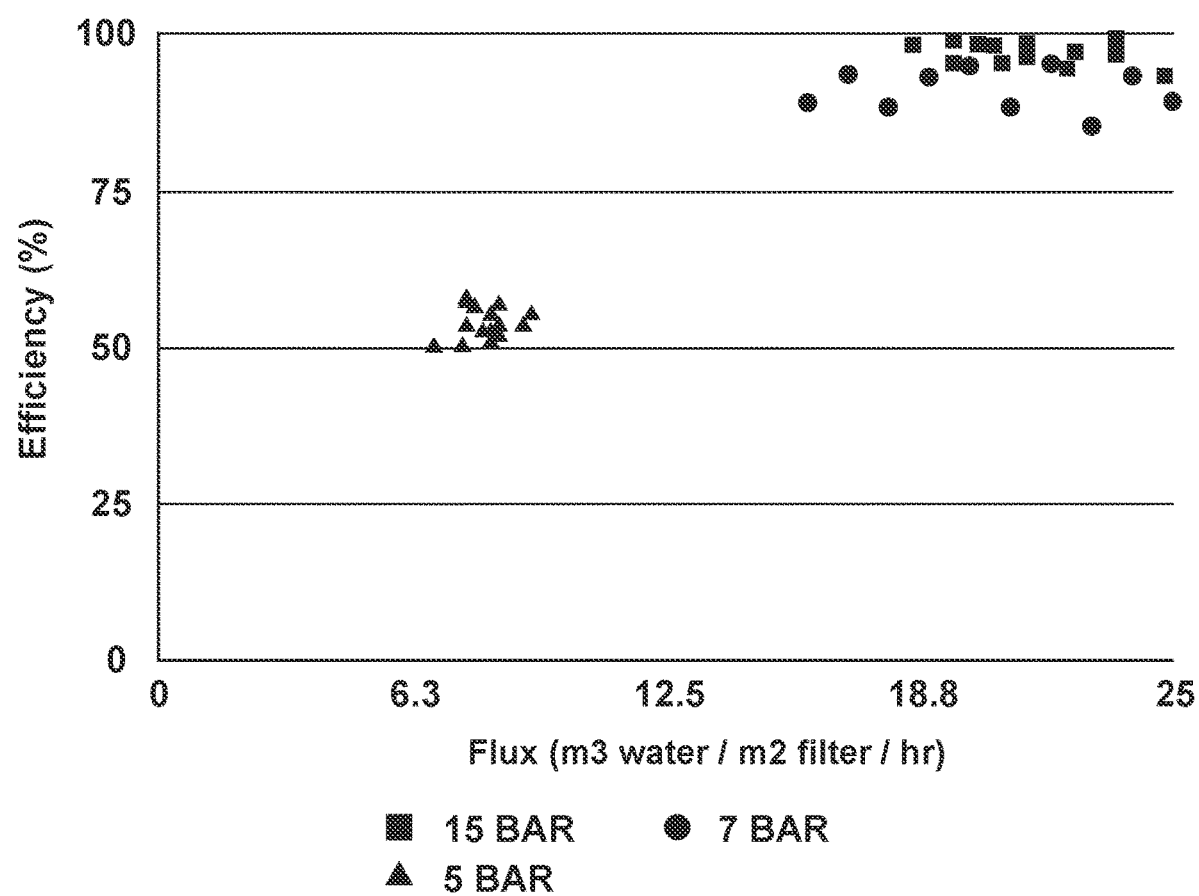
FIG. 4 is a plot showing the flux of graphene membranes that were created.

FIG. 4 shows the result of the flux testing. Flux is shown on the x-axis, in terms of $m^3$ of water flow per $m^2$ of membrane in one hour. Efficiency is shown on the y-axis. An efficiency of zero would be the membrane removing none of the salt and an efficiency of 100% would be the removal of all salt.

The results indicate that an operating pressure of 7 Bar produces results similar to current commercially available reverse osmosis membranes and an operating pressure of 15 Bar is on par with current commercially available membranes. The salt content of the filtered solution was 10% of sea water resulting in osmotic pressure of about 3 Bar. This suggests that that an overpressure of between 4 and 12 bar might be required, depending on the desired purity.

We claim:

1. A method for making a graphene membrane, comprising:
   a. applying a suspension of iron-functionalized graphene platelets in a fluid onto a porous substrate so that the iron-functionalized graphene platelets are parallel to the porous substrate by spraying the suspension of graphene platelets in the fluid onto an upstream surface of the porous substrate;
   b. applying a vacuum to a downstream surface of the porous substrate to force the fluid through the substrate while retaining the graphene platelets on the substrate, to yield a filtered fluid and a graphene membrane comprising the graphene platelets and the porous substrate; and
   c. after steps a. and b., applying a magnetic field to the iron-functionalized graphene platelets to re-orient the iron-functionalized graphene platelets so that the iron-functionalized graphene platelets are non-parallel to the porous substrate.

2. The method of claim 1, wherein the process is a continuous process.

3. The method of claim 2, wherein the porous substrate is in the form of a moving belt, and steps a. and b. are carried out while the porous substrate is moving.

4. The method of claim 1, wherein the process is a batch process.

5. The method of claim 1, wherein the fluid is a liquid.

6. The method of claim 5, wherein the liquid comprises water, alcohol, and/or an organic solvent.

7. The method of claim 6, wherein the organic solvent comprises N-methyl-pyrrolidone.

8. The method of claim 1, wherein the graphene platelets comprise graphene oxide.

9. The method of claim 1, wherein the porous substrate comprises polytetrafluoroethylene (Teflon), polysulfone (PsF), polyester (PE), and/or cellulose.

10. The method of claim 1, wherein the porous substrate comprises polysulfone (PsF).

11. The method of claim 1, wherein the graphene platelets are non-porous.

12. The method of claim 1, wherein in the membrane, the graphene platelets are arranged in at least one stack.

13. The method of claim 12, wherein the stack is a disorderly stack.

14. A method for filtering water, comprising:
   a. making a filter by i) applying a suspension of iron functionalized graphene platelets in a fluid onto a porous substrate so that the iron-functionalized graphene platelets are parallel to the porous substrate by spraying the suspension of graphene platelets in the fluid onto an upstream surface of the porous substrate, ii) applying a vacuum to a downstream surface of the porous substrate to force the fluid through the substrate while retaining the graphene platelets on the substrate, to yield a filter comprising the graphene platelets and the porous substrate; and iii) after steps i) and ii), applying a magnetic field to the iron-functionalized graphene platelets to re-orient the iron-functionalized graphene platelets so that the iron-functionalized graphene platelets are non-parallel to the porous substrate; and
   b. passing water between the graphene platelets of the filter, to filter the water.

15. A method for making a graphene membrane comprising:
   a. applying iron-functionalized graphene platelets onto a substrate so that the iron-functionalized graphene platelets are parallel to the substrate; and
   b. after step a., applying a magnetic field to the iron-functionalized graphene platelets to re-orient the iron-functionalized graphene platelets so that the iron-functionalized graphene platelets are non-parallel to the substrate.

16. The method of claim 15, wherein step a. comprises spraying a suspension of the iron-functionalized graphene platelets in a fluid onto the substrate.

17. The method of claim 16, wherein the fluid is a liquid, and the method further comprises drying the liquid.

18. The method of claim 17, wherein the liquid comprises water, alcohol, and/or an organic solvent.

19. The method of claim 18, wherein the organic solvent comprises N-Methyl-2-pyrrolidone.

20. The method of claim 15, wherein the substrate is porous, and step a. comprises applying a suspension of the iron-functionalized graphene platelets in a fluid onto the substrate, and applying a pressure differential to force the fluid through the porous substrate while retaining the graphene platelets on the substrate.

* * * * *